United States Patent [19]
Varley

[11] Patent Number: 5,595,227
[45] Date of Patent: Jan. 21, 1997

[54] ADJUSTABLE FENCE ASSEMBLY USED WITH JOINTER-PLANER MACHINES

[75] Inventor: David A. Varley, Pottstown, Pa.

[73] Assignee: American Machine & Tool Company, Inc. of Pennsylvania, Royersford, Pa.

[21] Appl. No.: 452,595

[22] Filed: May 25, 1995

[51] Int. Cl.$^6$ .................................. B27C 1/14; B27C 1/12
[52] U.S. Cl. ..................... 144/253.6; 144/117.1; 144/253.1; 451/303
[58] Field of Search ................... 144/114 R, 117 R, 144/253 R, 253 G, 253 H, 253 J, 253.1, 253.6; 451/303; 83/468.7

[56] References Cited

U.S. PATENT DOCUMENTS

| | | | |
|---|---|---|---|
| 2,575,250 | 11/1951 | Copp | 144/253 G |
| 2,758,617 | 8/1956 | Taylor | 144/253 G |
| 2,804,107 | 8/1957 | Taylor | 144/253 G |
| 2,872,957 | 2/1959 | Eschenburg | 144/253 G |
| 4,924,633 | 5/1990 | Hock et al. | 144/253 R |
| 5,022,447 | 6/1991 | Monobe | 144/253 G |
| 5,143,128 | 9/1992 | Chen | 144/253 G |

OTHER PUBLICATIONS

Owners Manual, "*Sears*/Craftsman® 5-⅛-Inch Jointer--Planer", Sears, Roebuck and Co., Hoffman Estates, Illinois, Jul. 1990 (16 pages).
Instruction Manual, "6" Variable Speed Bench Jointer (Model 37-070)", Delta International Machinery Corp., Memphis, Tennessee, Nov. 1992 (22 pages).
Owner's Operating Manual, "6-⅛" Jointer–Planer / JP-155" Ryobi Limited, Hiroshima, Japan, (6 pages plus front and rear cover sheet).
B. Maas, "Two New Jointers/Innovative approaches to a standard shop machine", *Fine Woodworking*, Jan./Feb. 1990, (pp. 80–81).

*Primary Examiner*—W. Donald Bray
*Attorney, Agent, or Firm*—Panitch Schwarze Jacobs & Nadel, P.C.

[57] ABSTRACT

An adjustable fence assembly includes a planar fence secured with a handle having an arcuate body portion which is rotatably coupled through an arcuate trolley member with an arcuate body portion of a fence traveler. The fence is directly pivotally coupled along its lower edge to the traveler along an axis of rotation which lies generally along the lower surface of the traveler. The lower traveler surface is supported on an upper surface of a fence track, which can be adjustably mounted to the rear cover of a conventional jointer-planer. Each arcuate body portion is about 45° or less in arcuate extent with respect to the pivot axis to permit the portions to collapse and the fence to be rotated from an upright position to at least a 45° position away from the jointer-planer. The angular position of the fence is selectably adjustable through the use of a single threaded fastener. Lateral position of the fence with respect to the jointer-planer is selectably adjustable through a second adjustable fastener. An angular guide attached to the fence provides a direct readout of the angular position of the fence. The collapsible linkage further permits the fence traveler carrying the fence to be extended over the tables.

18 Claims, 6 Drawing Sheets

ADJUSTABLE FENCE ASSEMBLY USED WITH JOINTER-PLANER MACHINES

FIELD OF THE INVENTION

The invention relates to fences used with jointer-planer machines and such machines with fences.

BACKGROUND OF THE INVENTION

Jointer-planer machines are power tools used by both hobbyists and professionals to apply smooth flat surfaces to lengths of wood. Such machines generally comprise a base supporting an infeed table, an outfeed table and a rotary knife positioned extending across the base and generally between and at least partially above the tables. Generally the relative height of the rotary knife with respect to the tables can be adjusted so that a desired portion of the upper side of the rotary knife extends slightly above the adjoining ends of the tables. Typically a fence is provided along one side of the tables to provide a surface that can be used for guiding wood in a straight line across the tables and over the rotary knife. Usually such fences are generally at least perpendicular to the table surfaces so a uniform right angle can be applied to the wood. Typically, said fences are also pivotally adjustable with respect to the tables so that, if desired, chamfers or beveled edges may be provided to such wood surfaces.

Prior to the present invention, pivotal support of the fence has generally been provided by at least a pair of adjustable brackets located either at the outer longitudinal ends of the fence or at least as close to the outer ends of the fence as they are to one another. This creates some problem in that, in some fence assemblies, the fence must be held with one hand while one adjustable fastener is locked. Then a second adjustable fastener must be separately aligned and locked. In some fence assemblies it may be possible to adjustably support the fence holding onto both adjustable fasteners but again, the user has to typically adjust the position of the fence at each bracket before the adjustable fastener is secured. Not only does this take additional time, but in an inexpensively manufactured assembly it may be difficult to get both brackets aligned at the same angles with respect to the jointer-planer itself.

A so-called one-handed adjustable fence has been designed for jointer-planers but, in practice, requires multiple hands and careful manipulation for adjustment. This design uses a pivotal linkage to support the fence and is relatively complex. The resulting cost of the linkage eliminates it as a viable candidate for smaller, less expensive machines. The linkage further requires movement of the fence about three spaced-apart pivot points for adjustment. Because the net pivotal movement of the fence is a sum of individual pivotal movements of portions of the linkage, it is neither convenient nor simple to measure the angular movement of the fence directly from the linkage.

SUMMARY OF THE INVENTION

A fence assembly for use with a jointer-planer having a base housing a motor and supporting an infeed table, an outfeed table and a rotary knife positioned across the base and generally between and at least partially above the infeed and outfeed tables, the fence assembly comprising: a fence having at least one generally planar side and an opposing side; a fence traveler pivotally supporting the fence; a fence track slidably supporting the fence traveler with the fence for linear movement of the fence traveler on the fence track and pivotal movement of the fence on the fence traveler; and a fence trolley simultaneously movably coupled with the fence and the fence traveler, the fence trolley being shaped and positioned to rotate at least partially into and out of at least one of the fence and the fence traveler with pivotal movement of the fence on the fence trolley.

BRIEF DESCRIPTION OF THE DRAWINGS

The foregoing summary as well as the following detailed description of preferred embodiments will be better understood when made in conjunction with the appended drawings. For the purpose of illustrating the invention, there is shown diagrammatically in the drawings, embodiments which are presently preferred. It should be understood, however, that the invention is not limited to the specific embodiments, instrumentalities, elements and methods disclosed in the drawings.

DETAILED DESCRIPTION OF PREFERRED EMBODIMENTS

Certain terminology is used in the following description for convenience only and is not intended to be limiting. The words "right", "left", "lower" and "upper" designate directions in the drawings to which reference is made. The words "radial" and "axial" refer to directions perpendicular to and along the central axis of an object, element or structure referred to are the words "inwardly" and "outwardly" refer to directions towards and away from, respectively, the geometric center of the object, element or structure. The terminology includes the words above specifically mentioned, derivatives thereof and words of similar import. Moreover, throughout the drawings, like numerals are used to indicate like elements.

Figure 1:
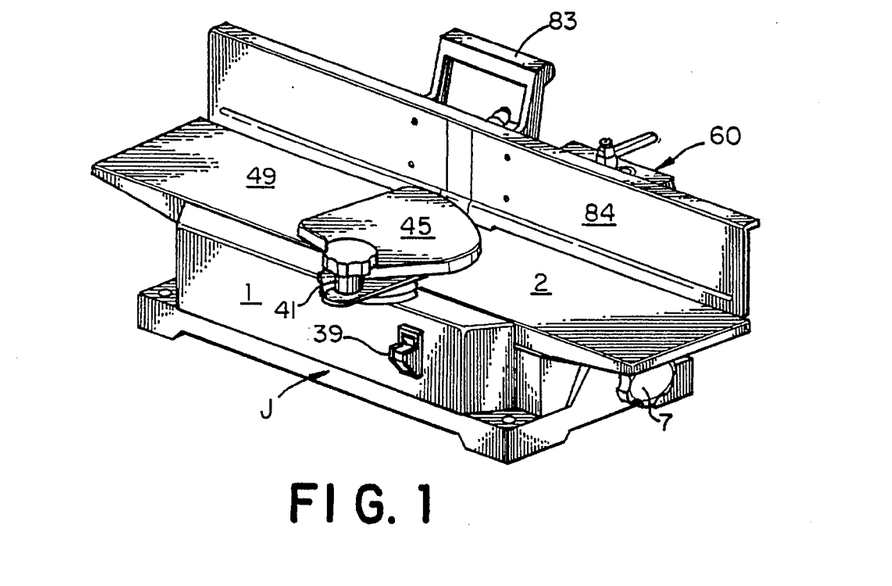
FIG. 1 is a perspective view of an exemplary jointer-planer incorporating the fence assembly of the present invention.

Referring to FIG. 1, a conventional jointer-planer, indicated generally at J, supports along its "rear" side, an adjustable fence assembly of the present invention indicated generally at 60.

Figure 2:
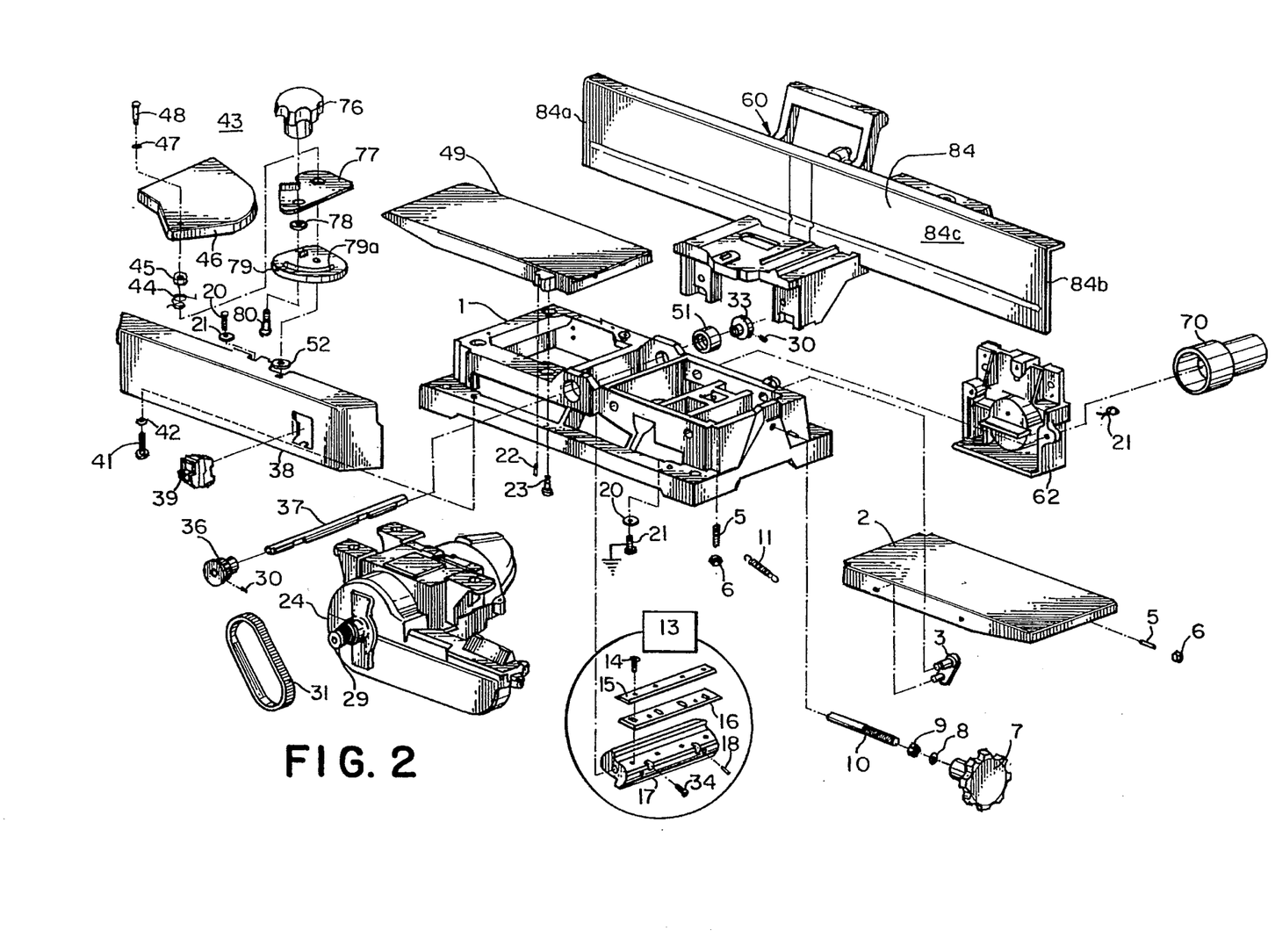
FIG. 2 is a partially exploded view of the apparatus of FIG. 1 showing the major components of the jointer-planer.

FIG. 2 is a partially exploded view showing the major components of the jointer-planer J in combination with the assembled fence. The jointer-planer includes a base supporting an infeed table 2 by means of four rocker link hinges, one of which is indicated at 3. The height of the outer end of the infeed table 2 is adjusted by means of a hand knob 7 mounted on a partially threaded shaft 10, which also supports a lock washer 8 and hex jam nut 9 to secure the knob 7 on the end of shaft 10. The threads of the shaft 10 also received in a threaded bore provided in the near end of the base 1. Infeed table 2 can be spring biased by spring 11 to remain seated in a set position. Set screws 5 with nuts 6 can be provided to limit maximum up and down adjustment of table 2 with respect to base 1. A rotary knife in the form of a cutter head assembly, indicated generally at 13, is supported by base 1. The assembly 13 includes a pair of blades 16 held to a cutter head 17 by blade clamps 15 and screws 14, only one of the blades 16 and clamps 15 being shown. The blade is thus positioned so that the height of its extreme outward end above the tables can be adjusted in relation to a fixed outfeed table 49.

An outfeed table 49 is fixedly secured to the base 1 on an opposite side of the cutter head assembly 13 from the infeed table 2 with screws 23. Set screws 22 permit adjustment of the table 49 on base 1 with respect to infeed table 2. A rear cover 62 is mounted with screws 21 (one shown) over the center rear portion of the base 1 covering the rear side of the cutter shaft 37. If desired, a spigot type adapter 70 can be mounted over an opening through the rear cover 62 to couple a vacuum hose to the rear side of the jointer-planer J to permit chips and other debris to be drawn directly into a vacuum.

A motor housing 24 supports and protects a motor having a drive shaft (neither shown) supporting a motor pulley 29. A multiple V-belt 31 is provided to couple the motor pulley 29 to a machine pulley 36 mounted by set screw 30 to one end of a cutter shaft 37. The cutter head assembly 13 is fixedly supported by the cutter shaft 37 between longitudinal sidewalls of the base 1. A pair of ball bearings 51 are provided to rotatably support the cutter shaft 37, only one of the bearings being shown. If desired, a detent ring 33 may be fixedly secured to the remaining end of the cutter shaft 37, where the ring 33 is accessible on the rear side of the base 1. The detent ring is provided to receive the end of a detent member (not depicted), which can be used to hold the cutter shaft 37 and cutter head assembly 13 from rotation for adjustment. A front cover 38 is mounted to the front side of the base 1 with fastener 41 and washer 42 covering the pulleys 29 and 36 and belt 31. A switch 39 is mounted on the cover and electrically coupled with the motor in housing 24 to control its operation.

An adjustable cutter guard assembly is indicated generally at 43 in FIG. 1 and is mounted on the front cover 38 by means of a shoulder bolt 48. The shoulder bolt 48 further passes through a guard stop 77 and a guard stop bracket 79 before entering the front cover 38. An adjustable fastener is provided by means of a guard stop knob 76, which receives a bolt 80 that passes through a slot 79a on the guard stop bracket 79, washer 78 and a bore through the guard stop 77. The bracket 79 permits the stop of the guard stop 77 to be rotatably adjusted with respect to the guard member 45 to limit the movement of the guard member 45 away from the fence assembly 60. The jointer-planer J described thus far and depicted in detail in FIG. 2 is entirely conventional.

Figure 3:
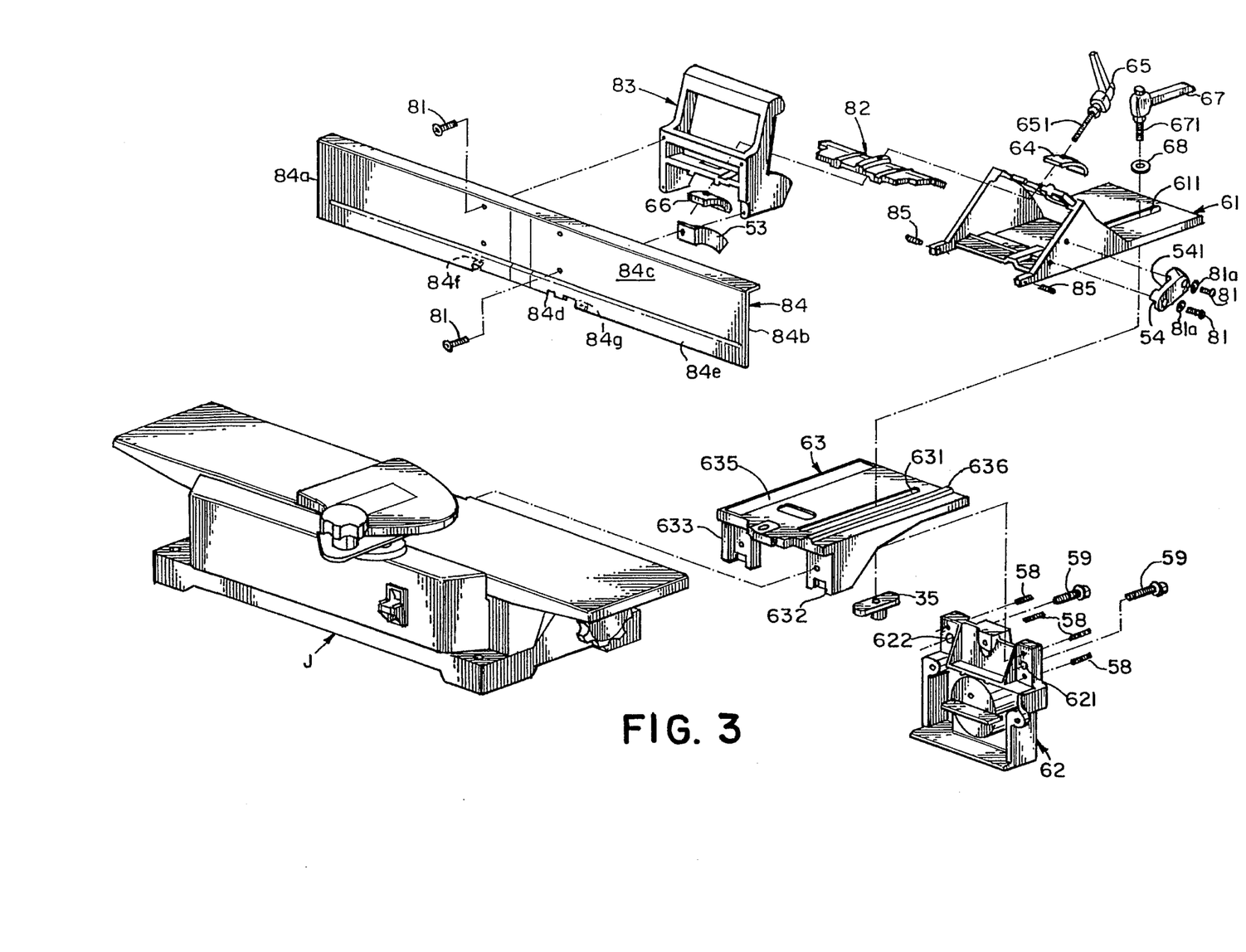
FIG. 3 is a partially exploded view of the apparatus of FIG. 1 showing the major components of the fence assembly of the present invention and rear cover of the jointer-planer.

FIG. 3 shows, in exploded view, the components of the preferred embodiment fence assembly 60 of FIG. 1. The assembly includes a handle 83 fixedly secured with a planar fence member 84 by conventional means such as screws 81 at a central position between longitudinal ends 84a and 84b of the fence. A planar surface 84c of the fence member 84 faces the tables 2 and 49 of the jointer-planer J. A centrally located cut-out 84d is provided along a lower edge 84e of the fence member 84. Transverse ears 84f, 84g are formed from portions of the fence member 84 displaced to define cut-out 84d. Journal openings are provided through the ears 84f, 84g to pivotally receive roll pins 85. Roll pins 85 form a hinge or pivot coupling between traveler 61 and fence 84. So mounted, handle 83 forms an integral part with the fence member 84 and vice versa. The fence assembly also includes a fence traveler 61 pivotally supporting the fence member 84 and a fence track 63 slidably supporting the fence traveler 61 with the fence member 84 for linear movement of the fence traveler 61 on the fence track 63 over and away from the infeed and outfeed tables 2 and 49.

The fence 84 is pivotally supported by and coupled with the fence traveler 61 through handle 83 and a separate fence trolley 82 and further through the pair of roll pins 85. The main body of the fence trolley 82 is arcuately curved having a convex outer surface 820 and opposing concave inner surface 821 seen in FIGS. 10 and 11, respectively. The trolley 82 is sized and shaped in a manner to be described below so that it interferingly engages with both the fence handle 83 and the fence traveler 61 in the upright position of the fence 60 and slips between similarly curved portions of both the handle 83 and traveler 61 when the fence 60 is pivoted away from its most upright vertical position generally perpendicular to the upper surfaces of the jointer-planer tables 2 and 49. An angle scale 53 is provided fastened between the fence member 84 and handle 83 along one side of the handle 83. An angle scale window 54 is secured to an adjoining side of the traveler 61 by conventional means such as screws 81 and washers 81a. The window 54 has an arcuate cutout 541 on the side facing the traveler 61 providing a slot to receive the gauge 53. The traveler 61 may have a channel to receive the gauge 53.

A first adjustable fastener is preferably provided in the form of an arcuately curved cap washer 64, a lock handle 65 having a threaded shaft 651 and an arcuately curved nut 66 having a central bore threaded to threadingly mate with the threads on shaft 651. Shaft 651 additionally passes through portions of the traveler 61, trolley 82 and handle 83 as will be described shortly in more detail.

A longitudinally extending slot 611 is provided in the fence traveler and lies in alignment over a comparable longitudinally extending slot 631 provided through the main body of the fence track 63. A second adjustable fastener in the form of a lock handle 67 with threaded shaft 671 and an elongated nut 35 is provided to releasably fix the fence traveler 61 with fence track 63 at a selected lateral position with respect to the tables 2 and 49 of the jointer-planer.

Referring to FIG. 3, upper surface 634 of the track 63 is essentially flat but for a slightly raised, planar land 635, which adjoins one side edge of the track 63, and a narrower rail 636, which projects upwardly to a greater degree from the otherwise planar upper surface 634 near the opposing side edge of the track 63.

Figure 4:
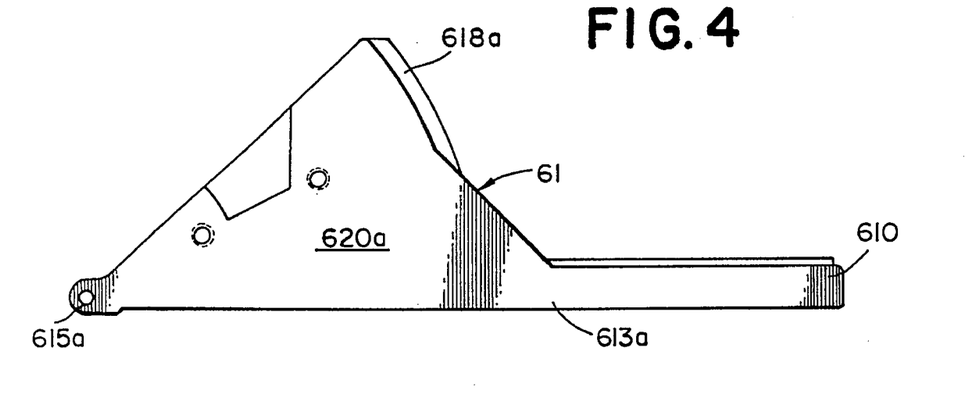
FIG. 4 is a side elevation of the fence traveler of the fence assembly of the present invention.
Figure 5:
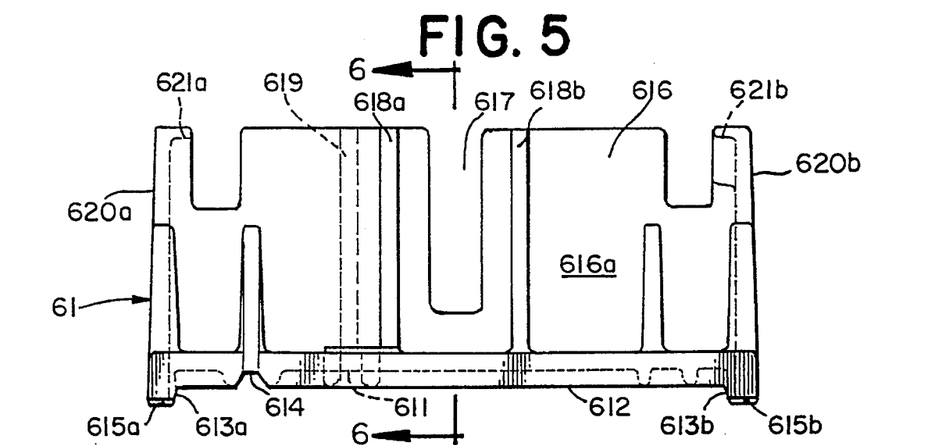
FIG. 5 is a view from the right side of FIG. 4.
Figure 6:
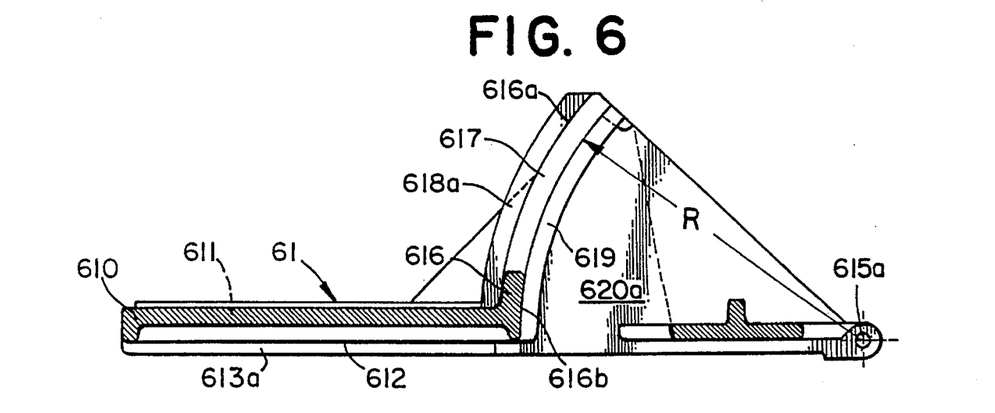
FIG. 6 is a cross-sectional view taken along the lines 6—6 of FIG. 5.

The fence traveler 61 is shown in greater detail in FIG. 4–6. Traveler 61 includes a base 610 supporting at one end an upwardly extending structure including an arcuate portion indicated generally at 616. Ribs along the edges and between the edges form an essentially flat horizontal lower surface 612 of the traveler 61 which faces the substantially flat upper surface 634 of the track 63. The traveler 61 is preferably slightly wider than the track 63 and is provided with descending longitudinal edge flange portions 613a and 613b, which overlap longitudinal side edges of the track 63. A longitudinally extending channel 614 is provided in the lower surface 612 at a location to receive the rail 636 of track 63. Preferably its edges are chamfered symmetrically to the edges of the rail 636 so as to slidably mate with rail 636 for a smoother sliding motion and to eliminate side to side play between the traveler 61 and track 63. The lower surface 612 of the traveler is also supported on the raised planar land 635 of the upper surface 634 of the track 63. In this way, the traveler 61 is matingly slidingly supported on the upper surface 634 of the track 63.

A pair of opposing journal openings 615a, 615b, are provided on opposing sides of the forward end of the traveler 61 to receive roll pins 85. The lowermost edges of the journal openings are generally tangential with the lower surface 612 of the traveler. Arcuate portion 616 has a radius of curvature R originating at a centerline through each of the journal openings 615a, 615b and roll pins 85, which centerline defines the sole pivot axis 86 of the fence 60. The arcuate portion 616 has a convex outer side 616a and an opposing concave inner side 616b. A central, longitudinal slot 617 extends through the arcuate portion 616 from the uppermost edge of that portion down to just above the base 610. The slot 617 is flanked by a pair of symmetrically positioned rails 618a, 618b, which project outwardly from the convex outer surface 616a. A concave rail 619 projects outwardly from the concave inner surface 616b of the arcuate portion 616. The arcuate portion 616 is further coupled generally with the base 610 by a pair of opposing, integral sidewall 620a, 620b. Each sidewall 620a, 620b supports an inwardly extending flange 621a, 621b, respectively, at its extreme upper end.

Figure 7:
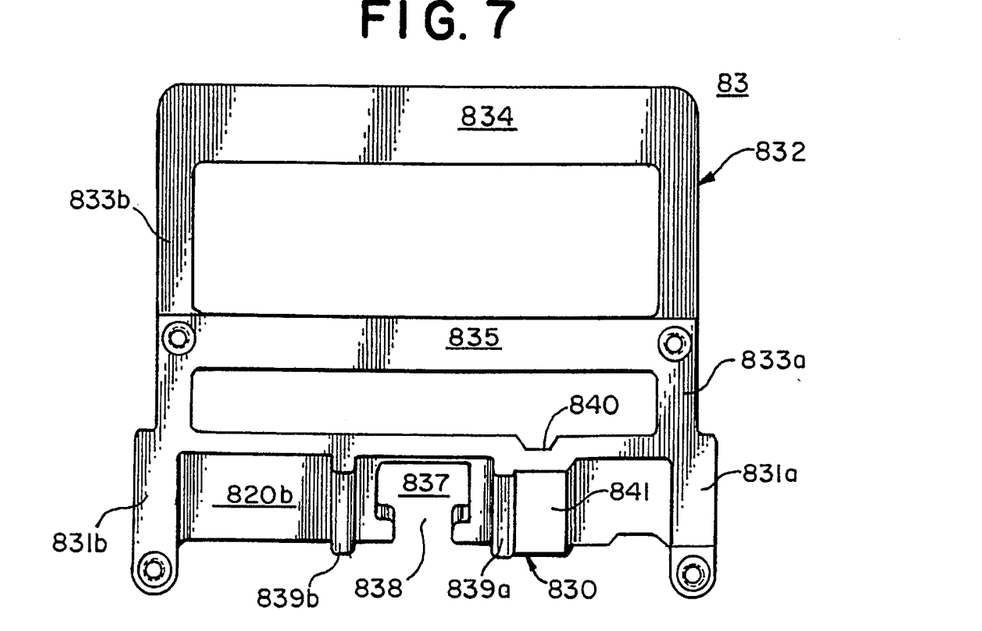
FIG. 7 is a front elevational view of a handle portion of the fence of the present invention.
Figure 8:
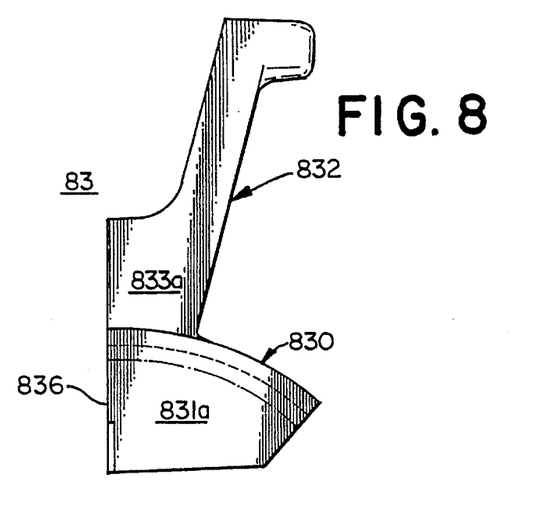
FIG. 8 is a side elevational view from the right side of FIG. 7.
Figure 9:
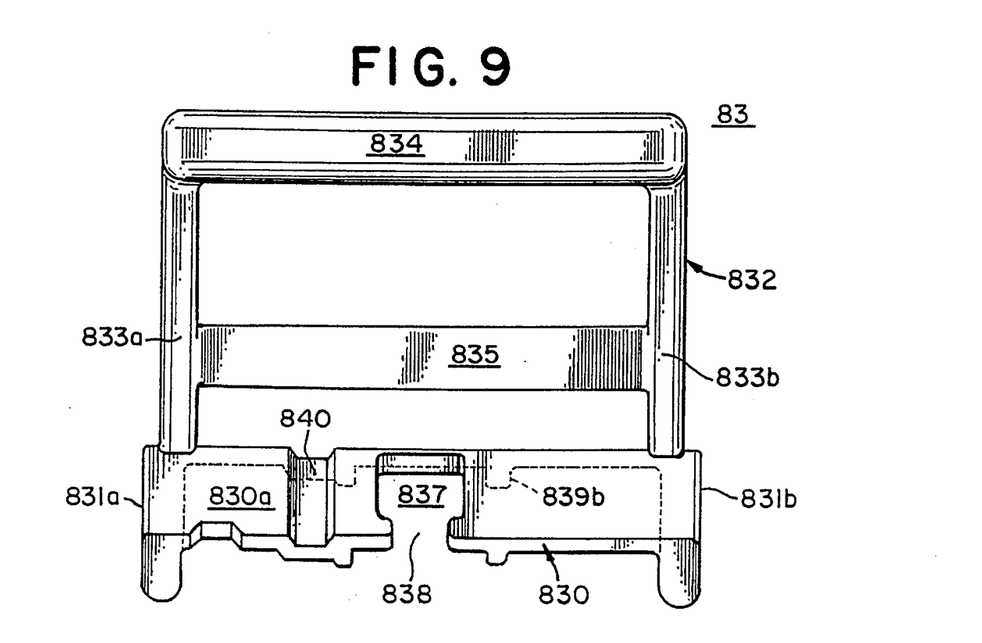
FIG. 9 is a rear elevational view from the right side of FIG. 8.

FIGS. 7 through 9 show details of the handle 83. The handle 83 includes an arcuate portion indicated generally at 830 flanked by a pair of opposing sidewalls 831a, 831b. The arcuate portion 830 and sidewalls 831a, 831b support a yoke portion indicated generally at 832 formed by a pair of opposing arms 833a, 833b, a cross bar 834 and a reinforcement rib 835. A "front" generally planar side 836 is provided to mate against the facing, opposing side of the fence member 84. A centrally located slot 837 extends longitudinally from the opposing "rear edge" of the arcuate portion 830 towards the front side 836. A neck 838 is formed at the mouth of the slot by inward extensions of the arcuate portion 830. A pair of parallel concave rails 839a, 839b are provided projecting from the concave surface 830b of the arcuate portion 830 and are symmetrically positioned on either side of the centrally located slot 837. A longitudinally extending channel 840 is provided along the convex outer surface 830a of the arcuate portion 830. A concave land 841 is provided projecting from the concave inner surface 830b of the arcuate portion 830 directly opposite channel 840.

Figure 10:
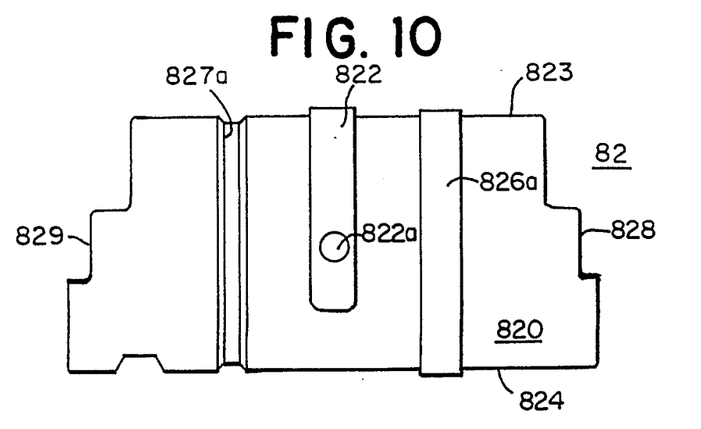
FIG. 10 is an elevational view of a convex major side of the fence trolley of the present invention.
Figure 11:
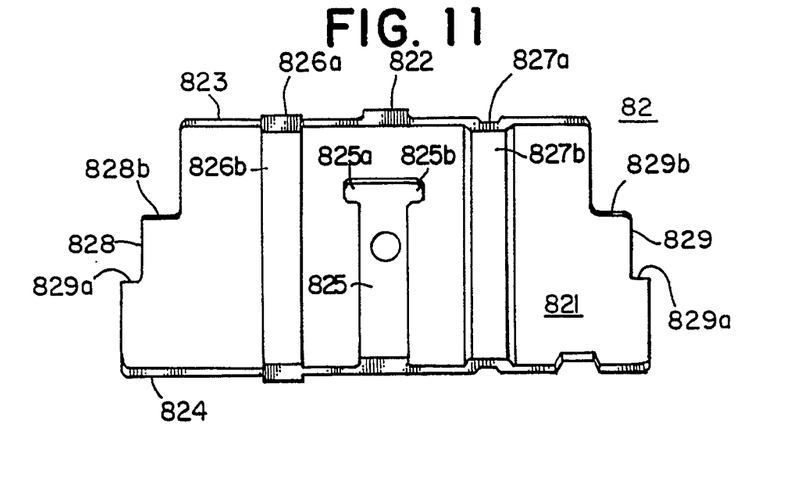
FIG. 11 is an elevational view of the opposing, concave major side of the fence trolley of the present invention.

FIGS. 10 and 11 depict the fence trolley 82 used to pivotally couple the handle portion 83 of the fence 60 with the fence traveler 61. Fence trolley 82 has an arcuate, preferably radiused body with opposing radiused convex and concave sides 820 and 821 seen in FIGS. 10 and 11, respectively. All of the salient surface features on convex side 820 can also be seen in FIG. 11 on the concave side. The convex side 820 supports a raised, convex, longitudinally extending, centrally located guide 822, which extends from an "upper" edge 823, which is located more proximal the fence 60, particularly fence member 84, than is an opposing "lower" edge 824. Concave side 821 supports a concave, longitudinally extending guide 825 centrally located opposite the convex guide 822. The concave guide 825 includes a pair of opposing "ears" 825a, 825b extending transversely from the "uppermost" end of the concave guide 825. A bore 822a extends through both guides 822 and 825. Preferably, the concave guide 825 stops short of the upper edge 823. A pair of opposing, outwardly projecting, convex and concave rails 826a, 826b are provided between the centrally located guides 822, 825 and a side edge 828 of the trolley. A convex shaped, longitudinally extending channel 827a and protruding, concave shaped rail 827b are provided between the centrally located guides 822, 825 and an opposing side edge 829 of the trolley symmetrically positioned with respect to the opposing rails 826a, 826b. Opposing shoulders 828a, 829a are provided along the side edges 828, 829 proximal the lower edge 824 of the traveler. More severely indented shoulders 828b, 829b are also provided on the side edges 828 and 829, respectively, spaced closer to the "upper" edge 823. The purpose of these various structures on the fence traveler 61, fence trolley 82 and handle 83 will now be explained with reference to the previous FIGS. 4–11 and FIG. 12.

The fence track 63 is affixed and aligned to the jointer-planer rear cover 62. This can be done before shipment to assure proper fence location proximity to tables 2 and 49. The fence track 63 has a pair of legs 632, 633 which are positioned on an inner side of the rear cover 62 so as to be situated between the rear cover 62 and the base 1. A pair of machine screws 59 are passed through enlarged bores 621, 622 on either side of the rear cover 62 and are received in the threaded bore provided in each leg 632 and 633. The oversized bores 621, 622 permit some adjustment of the fence track 63 in the vertical plane. In addition, pairs of self-locking set screws 58 are provided through threaded bores (unnumbered) above and below the enlarged bores 621, 622 on either side of the rear cover 62. The set screws 58 extend through their threaded bores into contact with facing sides of the fence track legs 632, 633 and permit angular adjustment of the fence track 63 with respect to the rear cover 62 and with respect to the tables 2 and 49. The track 63 is mounted sufficiently high that the traveler 61 can pass over the upper surfaces of tables 2 and 49 with the fence 60.

Still referring to FIG. 3, handle 83 is attached to fence member 84 by a plurality of machine screws 81, two of which are indicated. At the same time angle scale 53 is captured by one of the screws between the fence member 84 and the handle 83. The angle scale window 54 is attached to the side of the fence traveler 61.

Fence member 84 is pivotally joined with the traveler 61 by means of the roll pins 85 extending through the journal opening 615a, 615b at the forward end of the traveler 61 and through the openings in transverse ears 84f, 84g formed from material removed from the lower edge 84c of fence member 84 to define cut-out 84e. Cut-out 84e is notched to receive rail 636 on fence track 63 when the traveler 61 is moved away from the tables 2, 49 to the rear of the jointer-planer J. This construction provides a single pivot axis 86 for fence 84, which axis lies along the horizontal planar upper surface 634 of the track 63 and the lower surface 612 of fence traveler 61.

The trolley 82 is next movably coupled with the handle 83 on fence 84 and the fence traveler 61. Concave side 821 of trolley 82 is placed against the convex side 830a of the arcuate portion 830 of handle 83 with the ears 825a, 825b of guide 825 positioned inward of the neck 838. The ears 825a, 825b engage the projections of the arcuate portion defining the neck 838 to slidingly secure the trolley 82 with the fence 84 through the fence handle 83. The threaded shaft 651 of the lock handle 65 is passed through the curved cap washer 64, bore 822a of the trolley 82, longitudinal slot 617 of the traveler 61 and into the arcuate nut 66, which is restricted in lateral movement by handle rails 839a, 839b. Washer 64 is similarly received between rails 618a, 618b of traveler 61 and restricted in lateral movement. While there still is sufficient radial play, the shoulders 828a, 829a of the traveler 82 must be passed under inwardly extending flanges 621a, 621b of the traveler 61 such that when the lock handle 65 is tightened sufficiently to eliminate the radial play and thereby prevent shoulders 828a, 828b from slipping under the flanges 621a, 621b, respectively, the trolley 82 slidably and interferingly engages with the traveler 61. Trolley rail 827b is received in handle channel 840 while trolley channel 827a receives traveler rail 619. The planar side 84c of the fence member 84 facing the infeed and outfeed tables 2 and 49 can be rotated from a 90° angle with respect to those tables and the upper surface 634 of the track 63 (seen in FIGS. 1–3) to at least an angle of 135° with respect to both (see FIG. 12, in phantom). At the same time, fence 60 can be positioned laterally anywhere from over the tables 2, 49 to laterally spaced away from the tables 2 and 49 to the rear of the jointer-planer J on track 63. The fence 60 can thus be set in angular position using only locking handle 65 and in lateral position using only locking handle 67.

Figure 12:
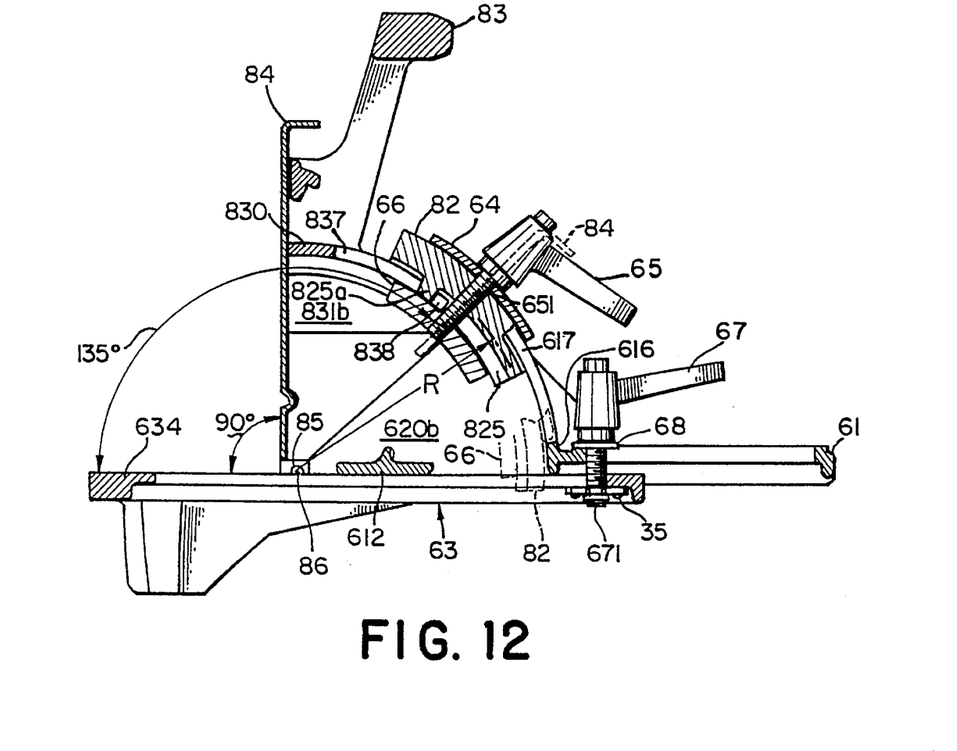
FIG. 12 is a sectional elevational view of the fence assembly of the present invention taken along each of the adjustable fasteners.

FIG. 12 is a cross sectional view of the fence assembly 60 taken through slot 631 in fence track 63 receiving the second adjustable fastener 67 and through the center of the remainder of the fence assembly 60. It will be appreciated that curved portion 616 of traveler 61 and 830 of handle 83 form, with the arcuate fence trolley 82, an arcuate linkage telescopically coupling the fence 84 with the traveler 61. The figure shows the radius of curvature R of the fence trolley 82 originating from the pivot axis 86 of the fence 84. The curved portion 616 of traveler 61 and 830 of handle 83 also have radii of curvature originating from the pivot axis 86, which are omitted from the figure for clarity of other features, thereby permitting the trolley 82 and the arcuate portion of the handle 83 to each be received in the arcuate portion of the traveler 61, as is indicated in phantom, when the fence member 84 is rotated away from its most upright position indicated in solid in the figure to its lowest position about 135° from the upper surfaces of the infeed and outfeed tables (not depicted). It will be appreciated that each arcuate portion 616 and 830 and the arcuate fence trolley 82 extends in an arc of about 45° or less around a common axis formed by the pivot axis 86. As a result, traveler 82 and handle portion 830 can collapse into the curved portion 616 of traveler 61, thereby permitting at least 45° of rotation of the fence 84 from its vertical position away from the adjoining tables 2, 49. It will be further appreciated that even greater degree of rotation of the fence 84 can be provided by utilizing more arcuate linkage members movably coupled to one another and each extending in an arc less than 45° about the common, pivot axis 86 provided by roll pins 85. The present design permits the traveler 61 with fence 84 to be extended over the infeed and outfeed tables 2 and 49, as neither of the other arcuate portions 830 and 82 of the linkages extend below the lower surface 612 of the traveler 61 when the fence is fully pivoted to its lowermost position.

While preferred embodiments have been disclosed and modifications thereto suggested, it will be recognized by those skilled in the art that other changes could be made to the above-described embodiments and proposed embodiments of the invention without departing from the broad inventive concepts thereof. It should be understood, therefore, that this invention is not limited to the particular embodiments or instrumentalities shown, but is intended to cover any modifications which are within the scope and spirit of the invention, as defined by the appended claims.

I claim:

1. A fence assembly for use with a jointer-planer having a base housing a motor and supporting an infeed table, an outfeed table and a rotary knife positioned across the base and generally between and at least partially above the infeed and outfeed tables, the fence assembly comprising:

a fence having at least one generally planar side and an opposing side;

a fence traveler pivotally supporting the fence;

a fence track configured to slidably support the fence traveler with the fence for linear movement of the fence traveler on the fence track and pivotal movement of the fence on the fence trolley; and a fence trolley simultaneously movably coupled with the fence and the fence traveler, the fence trolley being shaped and positioned to rotate at least partially into and out of at least one of the fence and the fence traveler with pivotal movement of the fence on the fence trolley.

2. The fence assembly of claim 1 wherein the fence traveler has a lower surface facing the fence track, wherein the fence track has an upper surface slidably receiving and supporting the lower surface of the fence traveler, wherein the fence has a bottom edge with a centrally located cutout shaped and positioned to receive at least part of the fence traveler and at least part of the fence track and wherein the fence is pivotally supported by the fence traveler to rotate on a pivot axis extending at least generally across the upper surface of the fence track.

3. The fence assembly of claim 1 wherein the fence trolley is generally arcuately shaped with a radius of curvature, the radius of curvature having an origin on the pivot axis.

4. The fence assembly of claim 3 wherein the fence traveler is generally centrally located along the fence, wherein at least a portion of the fence trolley projects transversely from the opposing side of the fence and wherein a portion of the fence traveler is matingly arcuately shaped and at least partially overlaps with the fence trolley and further comprising a first adjustable fastener simultaneously releasably engageable with the fence, the fence trolley and the fence traveler.

5. The fence assembly of claim 4 further comprising a second adjustable fastener simultaneously engageable with the fence traveler and the fence track.

6. The fence assembly of claim 5 adjustably mounted on one side of the jointer-planer.

7. The fence assembly of claim 1 adjustably mounted on one side of the jointer-planer.

8. A fence assembly for use with a jointer-planer having a base supporting an infeed table, an outfeed table and a rotary knife positioned across the base and generally between and at least partially above the infeed and outfeed tables, the fence assembly comprising:

a fence having a planar side and a lower edge;

a traveler located beneath the fence; and an arcuate linkage telescopically coupling the fence with the traveler, each piece of the linkage having an arcuate body portion with a radius of curvature originating from a common axis located proximal the lower edge of the fence, each arcuate body portion extending in an arc of about 45° or less around the common axis, and each body portion being sized and positioned to at least partially overlap one another to varying degrees as the fence is pivoted on the traveler about the common axis.

9. The fence assembly of claim 8 wherein the linkage includes an arcuate body portion extended from the fence, an arcuate body portion extended from the traveler and a separate arcuate trolley member movably coupled with each arcuate body portion extended from the fence and from the traveler.

10. The fence assembly of claim 8 wherein the linkage includes at least two arcuate members in addition to the fence and traveler.

11. The fence assembly of claim 8 further comprising a fence track configured to be fixedly secured to one side of the base adjoining each of the infeed and outfeed tables and to support the fence traveler with the fence and arcuate linkage for transverse movement at least towards and away from the infeed and outfeed tables.

12. The fence assembly of claim 11 wherein the fence track further supports the fence traveler from movement with the fence over the infeed and outfeed tables.

13. The fence assembly of claim 8 further comprising a pivot coupling between the fence and the fence traveler located proximal the lower edge of the fence generally along the common axis.

14. A fence assembly for use with a jointer-planar having a base supporting an infeed table, an outfeed table, and a rotary knife positioned across the base and generally between and at least partially above the infeed and outfeed tables, the fence assembly comprising:

a fence having a planar side and a lower edge;

a fence traveler pivotally coupled with the fence, the fence being rotatable on the fence traveler about a pivot axis fixed at the lower edge of the fence and with respect to the fence traveler so as to permit only rotational movement of the fence lower edge with respect to the fence traveler; and a linkage further coupling together the fence and the traveler.

15. A fence assembly for use with a jointer-planar having a base supporting an infeed table, an outfeed table, and a rotary knife positioned across the base and generally between and at least partially above the infeed and outfeed tables, the fence assembly comprising:

a fence having a planar side and a lower edge;

a fence traveler pivotally coupled with the fence, the fence being rotatable on the fence traveler about a pivot axis located proximal the lower edge of the fence and a lower side of the fence traveler; and a linkage further coupling together the fence and the traveler;

an arcuate body portion extended from the fence traveler toward the fence, an arcuate body portion extended from the fence toward the arcuate body portion of the traveler and wherein the linkage comprises an arcuate trolley member movable coupled with the arcuate body portions extended from the fence and the fence traveler and located between the arcuate body portions.

16. The fence assembly of claim 15 wherein each of the arcuate body portions and the arcuate trolley member extends in an arc of 45° or less around the pivot axis.

17. The fence assembly of claim 16 wherein the linkage permits a rotation of the fence at least about 45° about the pivot axis on the fence traveler.

18. The fence assembly of claim 14 wherein the linkage permits a rotation of the fence at least about 45° about the pivot axis on the fence traveler.

* * * * *